US006027570A

United States Patent [19]

Farr et al.

[11] Patent Number: 6,027,570

[45] Date of Patent: Feb. 22, 2000

[54] CLEANING METHOD FOR OPTICAL SURFACES OF URINE ANALYZERS

[75] Inventors: Jennifer Farr, Albion; Michael L. Bloczynski, Elkhart; James P. Albarella, Granger, all of Ind.

[73] Assignee: Bayer Corporation, Elkhart, Ind.

[21] Appl. No.: 09/080,181

[22] Filed: May 18, 1998

[51] Int. Cl.[7] .......................... C03C 23/00; C11D 65/06

[52] U.S. Cl. .......................... 134/2; 510/163

[58] Field of Search .......................... 134/2; 510/163, 510/183

*Primary Examiner*—Jill Warden

*Assistant Examiner*—Yolanda E. Wilkins

*Attorney, Agent, or Firm*—Jerome L. Jeffers

[57] ABSTRACT

Disclosed is a method for cleaning optical surfaces, such as those in a urine analyzer, which surfaces come into repeated contact with urine test samples. The method involves contacting the optical surfaces with an aqueous solution of a quaternary ammonium or phosphonium salt, a non-ionic surfactant and a divalent ion.

6 Claims, No Drawings

CLEANING METHOD FOR OPTICAL SURFACES OF URINE ANALYZERS

BACKGROUND OF THE INVENTION

The analysis of a patient's urine sample for various substituents can be a powerful diagnostic tool for the detection of abnormal or disease states. For example, the determination of leukocyte concentration in urine serves as an indicator of urinary tract infection. Likewise, determination of other urine constituents such as ketone for diabetes mellitus, proteins for renal disease, nitrite for urinary tract infection and occult blood for damage to the kidneys or urinary tract is a useful diagnostic tool. The determination of physical characteristics such as the urine's specific gravity, which gives an indication of the kidney's ability to concentrate or dilute urine, and the clarity of the urine which is related to the presence or absence of white or red blood cells, epithelial cells or bacteria can be determined by measuring the urine sample's refractive index and/or clarity characteristics through an optical surface, i.e. a viewing port of acrylic or other transparent material such as glass.

Modern, automated urine analyzers, which can analyze several hundreds of urine samples in a normal day's operation and operate in a manner which brings the urine samples into direct contact with the optical surface, present a problem with the maintenance of the clarity of the optical surface since even a slight disruption in its clarity can introduce error into the determination of the physical property being measured. Exemplary of such automated urine analyzers are those in which specific gravity is determined by passing light through an omega shaped optic in which the light lost at the sharp bends is a function of the index of refraction of the medium of the surface of the fiber. The light that travels to the opposite end of the omega from the light source is measured and used to determine the specific gravity of the sample. Any substance with a different index of refraction that coats the fiber will change the sensitivity of the sensor. Accordingly, it is important that the optic be cleaned without leaving refractive index altering residue.

Cleaning of the optical surface in automated urine analyzers is typically accomplished by rinsing it with a cleaning solution between the application of each urine sample. One such cleaning formulation comprises a water solution of N,N-bis(2-hydroxyethyl)-N-methyl- 9-octadecen-1-ammonium chloride. This solution, which is effective for dealing with the problem of false detection of leukocytes in negative urine samples that follow specimens that contain high levels of leukocytes, which problem is caused by the carry-over of leukocytes from sample to sample, has been found to be less than totally satisfactory because with intermittent rinsing, repeated contact of the optical surface with urine test samples tends to leave a residue on the surface which can distort the optical information which is transmitted therethrough.

It would be desirable and it is an object of the present invention to provide a cleaning solution for optical surfaces which come into repeated contact with urine test samples which solution is able to clean the surface in such a manner that the buildup of residue on the surface is avoided.

SUMMARY OF THE INVENTION

The present invention involves a method for cleaning the optical surface of a urine analyzer which surface comes into repeated contact with urine test samples. The method comprises contacting the optical surface with a cleaning solution which comprises:

a) a lipophilic quaternary ammonium or phosphonium salt of the formula:

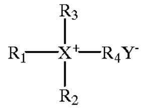

wherein $R_1$ is straight or branched chain alkyl of 7 to 24 carbon atoms; $R_2$, $R_3$ and $R_4$ are short chain alkyl of 1 to 4 carbon atoms, $X^+$ is N or P and $Y^-$ is an anion.

Optionally, the cleaning solution will also contain:

b) a non-ionic surfactant, and c) a divalent ion.

Also included within the scope of the present invention is the cleaning solution for use in the method as described above.

DESCRIPTION OF THE INVENTION

The present invention involves the formulation of a new cleaning solution for the cleaning of optical surfaces which are brought into repeated contact with urine test samples. Experience with automated urine analyzers has revealed that the optical surfaces through which optical data is transmitted need to be replaced more frequently than had been anticipated due to a buildup on the surface which, over time, becomes thick enough to distort the optical signal. It was determined that this buildup of residue was caused by interaction of the previously described quaternary ammonium salt solution with proteins inherently present in the urine test samples. Thus, while this solution is satisfactory for elimination of the leukocyte transfer problem, its repeated use for rinsing the optical surface creates additional problems. The interaction between this rinse solution and urinary proteins results in deposition of their reaction product onto the optical surface of the urine analyzer which, over time, results in a decrease in light transmission through the optical surface with a concomitant loss of sensitivity in the determination of the urine's physical properties by the urine analyzer.

Aqueous solutions of materials other than quaternary ammonium salts; such as sodium chloride, hydrochloric acid and citric acid; were found to be suitable for eliminating leukocyte carryover and did not affect the clarity of the optical system. However, in urine analyzers with conductive liquid level sensors these materials were too conductive for acceptable performance. Conductive liquid level sensors are devices in which a sample pipette consists of two coaxial stainless steel probes with the inner probe protruding several millimeters beyond the outer probe and separated by an insulation layer. An AC signal is applied to one of the probes while the other probe is connected to a voltage comparator. When the pipette assembly is placed into a urine sample, a voltage from the AC probe is sensed via the probe connected to the comparator. As the ionic concentration is increased, the resistance between the two probes decreases thereby allowing a higher voltage at the input of the comparator. When the comparator probe voltage is greater than or equal to that of a predetermined reference voltage, its output switches high, signaling to the analyzer that the pipette has entered the sample. Residual ions from the above mentioned materials left on the pipette cause the comparator probe's voltage to become greater than or equal to the reference probe's voltage thereby causing the analyzer to falsely sense that a sample has been entered, resulting in the failure of the analyzer to aspirate liquid from the urine specimens for deposition onto the reagent pads. Accordingly, the rinse solution of the present invention contains a quaternary ammonium salt and/or a phosphonium salt of the formula:

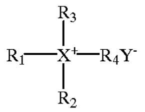

In the foregoing formula, $R_1$ is straight or branched chain alkyl of 7 to 24 carbon atoms; $R_2$, $R_3$ and $R_4$ are lower alkyl of 1 to 4 carbon atoms, $X^+$ is N or P and Y is an anion such as $Cl^-$, Br, or $HSO_4^-$. The alkyl groups can be substituted with solubilizing groups such as $OH^-$ or $CO_2H^-$.

These salts are effective to eliminate the problem of leukocyte carryover at a low enough concentration so as not to interfere with the analyzer's liquid level sensor. Furthermore, the adverse effect on the clarity of the optical surface is significantly reduced with the use of quaternary ammonium and/or phosphonium salts characterized by the above formula. Preferred salts are quaternary ammonium salts containing an alkyl chain (straight or branched) containing from 12 to 18 carbon atoms. Particular quaternary ammonium or phosphonium salts which are preferred for use in cleaning solutions for optical surfaces of urine analyzers which come into repeated contact with urine test samples include cetyltrimethylammonium hydrogen sulfate, cetyltrimethylammonium chloride, hexadecyltributylphosphonium bromide, tricaprylmethylammonium chloride and methyl bis(2-hydroxyethyl) cocoalkyl quaternary ammonium chloride, steryltributylphosphonium bromide and decyltributylphosphonium bromide. These quaternary ammonium or phosphonium salts, in aqueous solution, significantly reduce the cleaning solution's interaction with the optical surface due to their limited reactivity with urinary protein. The concentration of quaternary ammonium or phosphonium salt in the aqueous cleaning solution will typically range from 0.002 to 0.02% (w/v) with a concentration of 0.005 to 0.01% being preferred.

While selection of a quaternary ammonium or phosphonium salt as set out above improves the performance of the rinse solution by reducing the buildup of salt/protein reaction products on the optical surface, the problem is not entirely eliminated. It has been discovered that the addition of a non-ionic surfactant and a divalent ion to the quaternary ammonium or phosphonium salt based cleaning solution further reduces or eliminates the problem of residue buildup on the analyzer's optical surface.

Preferred non-ionic surfactants for use in the present invention are those which aid in the solubilization of proteins. Among this class of surfactants Tritons and Surfynols which are alkylaryl polyether alcohols and ditertiary acetylenic glycols, respectively are particularly suitable. Typical concentrations of the surfactant in the cleaning solution range from 0.005 to 0.08% (w/v) with a concentration of 0.01 to 0.04% being preferred.

The solubility of proteins in a liquid medium will vary with the ionic composition of the medium because proteins can bind certain cations and/or anions. Thus, neutral salts have pronounced effects on the solubility of globular proteins. In low concentrations, salts increase the solubility of many proteins by a phenomenon known as salting in with salts of divalent ions such as $MgCl_2$ and $(NH_4)_2SO_4$ being far more effective than salts of monovalent ions. The ability of neutral salts to influence the solubility of proteins is a function of their ionic strength. Salting in effects are caused by changes in the tendency of dissociable R groups on the protein to ionize. In the present invention, these salts must function at very low levels of ionic strength so as not to interfere with conductive liquid level sensors in the urine analyzer and not to contribute to the salting out of proteins. Divalent ions, introduced to the cleaning solution in the form of their soluble salts, are beneficial in preventing the quaternary ammonium or phosphonium salt from salting the urinary protein out of solution. Thus, divalent salts such as $MgCl_2$, $(NH_4)_2SO_4$, $MgSO_4$ and $CaCl_2$ typically in concentrations of from 0.05 to 0.7 mM (preferably 0.2 to 0.5 mM) can be included in the cleaning solution. Salts of divalent cations, such as magnesium chloride hexahydrate, can significantly reduce protein deposition problems by themselves, however, the concentration at which they are effective causes the rinse solution to interfere with the liquid level sensor in those urine analyzers which are so equipped. By combining the divalent salt with an appropriate quaternary ammonium or phosphonium salt and non-ionic surfactant, its concentration in the rinse solution can be reduced to a level at which it will not interfere with the liquid level sensor or other features of the analyzer which are affected by contact with highly conductive solutions.

By combining the quaternary ammonium or phosphonium salt, non-ionic surfactant and divalent ion in aqueous solution at the appropriate concentration, optical surface clarity and acceptable leukocyte carryover performance can be obtained with no interference to functions such as liquid level sensors which are sensitive to the ionic strength of the rinse solution. While the pH of the cleaning solution is not critical; a pH of from 1–10 is typical with a pH of from 1–4 being preferred.

As previously stated, the use of prior art rinse solutions of quaternary ammonium salts for optical surfaces which come into repeated contact with urine test samples to eliminate the problem of leukocyte carryover resulted in the deposition of a residue on the optical surface which was determined to be the reaction product of the quaternary ammonium salt and proteins inherently present in the urine sample. The quaternary ammonium or phosphonium salts used in the present invention also eliminate the leukocyte carry-over problem but with much less impact on the clarity of the optical surface. Since even those quaternary ammonium or phosphonium salts which interact with urinary proteins to a limited extent can, over time, affect the clarity of the urine analyzer's optical surface, two additional components, a non-ionic surfactant and a divalent ion are preferably added to the cleaning solution. These additives are believed to help maintain the clarity of optical surface either by solubilizing the reaction products formed by interaction of the quaternary ammonium or phosphonium salt and urinary protein or by preventing the formation of these reaction products. By whatever mechanism, the combination of these three components eliminates both the leukocyte carryover problem and the loss of throughput in the optical surface upon repeated contact with urine test samples.

The present invention is further illustrated by the following examples:

EXAMPLE I

A cleaning additive was prepared by dissolving 3.5% (w/v) cetyltrimethylammonium hydrogen sulfate, 3.5% w/v magnesium chloride hexahydrate and 10% w/v Triton X-100 (an iso-octyl phenoxy polyethoxy ethanol surfactant from Rohm & Haas) in distilled water. This additive was diluted by adding 2 mL to 1 liter of distilled water before using it to rinse the transfer pipette, specific gravity sensor and clarity sensor of a CLINITEK ATLAS® autoanalyzer. The cleaning solution was used for 75,000 replicate runs following the pipetting of a fresh urine sample into contact with the optical surfaces. The reagent performance, including leukocyte and occult blood carryover performance, were comparable to that obtained using a prior art solution (0.007% w/v) of N,N-bis(2-hydroxyethyl)-N-methyl-9-octadecen-1-ammonium chloride. The specific gravity and clarity performance characteristics were found to be superior, i.e. the loss in light throughput for the optics due to buildup was reduced to 1–2% from as much as a 15% loss in light throughput with the former cleaning solution.

The cleaning solution for this type of urine analyzer, in order to be fully acceptable should (1) eliminate leukocyte carryover, (2) have little or no effect on the optical throughput of the specific gravity and clarity sensors due to interaction between the rinse and the urine test sample, (3) have a low conductivity so as to not interfere with the instrument's liquid level sensor, (4) have no negative impact on reagent performance such as traditional ketone, protein, nitrite, glucose, bilirubin, urobilinogen, leukocytes occult blood urine reagents as well as the pH of the samples, and (5) be compatible with the instrument components with which it comes into contact. The first three criteria were particularly difficult to achieve since any single component that eliminated leukocyte carryover without affecting the specific gravity and clarity optics was sufficiently ionic to interfere with the analyzer's liquid level sensor. Any single component that had sufficiently low conductivity and eliminated leukocyte carryover caused throughput problems with the optical surfaces of the specific gravity and clarity sensors. Thus, a combination of a quaternary ammonium and/or phosphonium salt having a reduced tendency to interact with urinary proteins together with a non-ionic surfactant and a divalent ion which either prevent the urinary protein from complexing with the quaternary ammonium or phosphonium salt or help solubilize any quaternary ammonium or phosphonium salt/protein complex is necessary to meet the requirements necessary of the rinse solution.

EXAMPLE II

A cleaning solution containing 0.007% (w/v) cetyltrimethylammonium hydrogen sulfate without other additives was tested as in Example I with over 1500 replicate runs. The loss in light throughput due to buildup on the specific gravity and clarity optics was reduced to 3–5% from as much as 15% when using N,N-bis(2-hydroxyethyl)-N-methyl-9-octadecen-1-ammonium chloride at an equivalent 0.007 w/v % concentration.

We claim:

1. A method for cleaning and preventing the buildup of residue on the optical surface of an analyzer for urine which analyzer has such an optical surface through which light passes and which analyzer also is equiipped with a conductive liquid level sensor which method comprises contacting such optical surface with a aqueous formulation comprising 1) a quaternary ammonium or phosphonium salt of the formula:

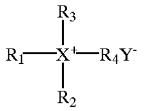

wherein $R_1$ is straight or branched chain alkyl of 7 to 24 carbon atoms; $R_2$, $R_3$ and $R_4$ are lower alkyl of 1 to 4 carbon atoms, $X^+$ is N or P and $Y^-$ is an anion;

2) a non-ionic siirfactant, and 3) a divalent ion at a concentration of from 0.05 to 0.7 mM.

2. The method of claim 3 wherein the quaternary ammonium salt is cetyltrimethylammonium hydrogen sulfate, cetyltrimethylammonium chloride, tricaprylmethylammonium chloride or methyl bis(2-hydroxyethyl) cocoalkyl quaternary ammonium chloride.

3. The method of claim 1 wherein the concentration of quaternary ammonium or phosphonium salt in the aqueous formulation is from 0.002 to 0.02% (w/v), the concentration of the non-ionic surfactant is 0.005 to 0.08% (w/v) and the concentration of the divalent salt is from 0.05 to 0.7 mM.

4. The method of claim 1 wherein the non-ionic surfactant is an alkylaryl polyether alcohol or a ditertiary acetylenic glycol and the divalent ion is contributed by $MgCl_2$, $(NH_4)_2SO_4$ or $CaCl_2$.

5. The method of claim 1 wherein $X^+$ is ammonium and $R_1$ is straight or branched chain alkyl containing from 12 to 18 carbon atoms.

6. A method for cleaning optical surfaces of a urine analyzer through which light passes and which come into repeated contact with urine test samples which method involves contacting the optical surface with a solution comprising in aqueous solution cetyltrimethylammonium hydrogen sulfate, magnesium chloride hexahydrate and an iso-octyl phenoxy polyethoxy ethanol surfactant.

* * * * *